US006964369B2

(12) United States Patent
Schilling

(10) Patent No.: US 6,964,369 B2
(45) Date of Patent: Nov. 15, 2005

(54) REMOVABLE CARD FOR USE IN A RADIO UNIT

(75) Inventor: Donald L. Schilling, Stands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 23 days.

(21) Appl. No.: 10/617,995

(22) Filed: Jul. 11, 2003

(65) Prior Publication Data

US 2004/0112955 A1 Jun. 17, 2004

Related U.S. Application Data

(60) Continuation of application No. 10/073,544, filed on Feb. 11, 2002, now Pat. No. 6,651,883, which is a continuation of application No. 09/886,497, filed on Jun. 21, 2001, now Pat. No. 6,382,507, which is a continuation of application No. 09/671,917, filed on Sep. 28, 2000, now Pat. No. 6,290,127, which is a continuation of application No. 09/421,733, filed on Oct. 20, 1999, now Pat. No. 6,170,745, which is a continuation of application No. 08/954,788, filed on Oct. 21, 1997, now Pat. No. 6,003,770, which is a continuation of application No. 08/685,595, filed on Apr. 26, 1996, now abandoned, which is a continuation of application No. 08/281,705, filed on Jul. 28, 1994, now abandoned, which is a division of application No. 07/956,851, filed on Oct. 6, 1992, now Pat. No. 5,359,182.

(51) Int. Cl.[7] ........................... G06K 5/00; H04M 3/00; H04Q 7/20
(52) U.S. Cl. ...................... 235/380; 455/419; 455/461
(58) Field of Search ............................... 235/375, 380, 235/382; 379/143–155; 455/73–90, 558, 550–575, 403–466; 705/1, 28, 500

(56) References Cited

U.S. PATENT DOCUMENTS

| | | | |
|---|---|---|---|
| 3,581,019 A | | 5/1971 | Ryan |
| 3,784,793 A | * | 1/1974 | Ito et al. ................. 379/355.09 |
| 4,680,785 A | | 7/1987 | Akiyama et al. |
| 4,706,275 A | | 11/1987 | Kamil |
| 4,734,928 A | | 3/1988 | Weiner et al. |

(Continued)

FOREIGN PATENT DOCUMENTS

| | | |
|---|---|---|
| DE | 4119924 A | 12/1992 |
| DE | 3702509 A | 8/1998 |

(Continued)

OTHER PUBLICATIONS

U.S. Appl. No. 3/784,793, Ito et al., filed Jan. 1974.
Walker, "Security in Mobile and Cordless Telecommunications" CompEuro '92, 'Computer Systems and Software Engineering', Proceedings, pp. 493–496, May 1992.

(Continued)

Primary Examiner—Diane I. Lee
Assistant Examiner—Jamara A. Franklin
(74) Attorney, Agent, or Firm—Volpe and Koenig, P.C.

(57) ABSTRACT

A removable card is used in radio units. The card comprises a memory for storing telephone numbers associated with an owner of the card. One of the telephone numbers is a telephone number of the owner. The memory is configured so that upon insertion of the card in a radio unit, that radio unit receives calls associated with the owner telephone number stored on the card.

3 Claims, 9 Drawing Sheets

U.S. PATENT DOCUMENTS

| | | | |
|---|---|---|---|
| 4,757,186 | A | 7/1988 | Heberle et al. |
| 4,759,056 | A | 7/1988 | Akiyama |
| 4,763,354 | A | 8/1988 | Fukushima et al. |
| 4,782,217 | A | 11/1988 | Soza et al. |
| 4,795,892 | A | 1/1989 | Gilmore et al. |
| 4,833,702 | A | 5/1989 | Shitara et al. |
| 4,845,740 | A | 7/1989 | Tokuyama et al. |
| 4,860,341 | A | 8/1989 | D'Avello et al. |
| 4,868,849 | A | 9/1989 | Tamaoki |
| 4,879,744 | A | 11/1989 | Tasaki et al. |
| 4,891,503 | A | 1/1990 | Jewell |
| 4,897,870 | A | 1/1990 | Golden |
| 4,907,257 | A | 3/1990 | Asano et al. |
| 5,003,585 | A | 3/1991 | Richer |
| 5,109,540 | A | 4/1992 | Dzung et al. |
| 5,127,040 | A * | 6/1992 | D'Avello et al. ........... 455/419 |
| 5,138,648 | A | 8/1992 | Palomeque et al. |
| 5,138,650 | A | 8/1992 | Stahl et al. |
| 5,146,217 | A | 9/1992 | Holmes et al. |
| 5,148,472 | A | 9/1992 | Freese et al. |
| 5,173,936 | A | 12/1992 | Ditzig et al. |
| 5,179,373 | A | 1/1993 | John |
| 5,197,092 | A | 3/1993 | Bamburak |
| 5,220,593 | A | 6/1993 | Zicker et al. |
| 5,251,248 | A | 10/1993 | Tokunaga et al. |
| 5,266,782 | A | 11/1993 | Alanara et al. |
| 5,297,189 | A | 3/1994 | Chabernaud |
| 5,297,192 | A | 3/1994 | Gerszberg |
| 5,325,424 | A | 6/1994 | Grube |
| 5,359,182 | A | 10/1994 | Schilling |
| 5,371,493 | A | 12/1994 | Sharpe et al. |
| 5,371,785 | A | 12/1994 | Marcinkiewicz |
| 5,396,650 | A | 3/1995 | Terauchi |
| 5,404,580 | A | 4/1995 | Simpson et al. |
| 5,577,104 | A | 11/1996 | Knuth et al. |
| 6,003,770 | A | 12/1999 | Schilling |
| 6,035,025 | A | 3/2000 | Hanson |
| 6,098,878 | A | 8/2000 | Dent et al. |
| 6,142,369 | A | 11/2000 | Jonstromer |
| 6,164,531 | A | 12/2000 | Harris et al. |
| 6,170,745 | B1 | 1/2001 | Schilling |

FOREIGN PATENT DOCUMENTS

| | | |
|---|---|---|
| EP | 0276403 | 8/1988 |
| EP | 502446 A | 9/1992 |
| GB | 2246269 | 1/1992 |
| JP | 0244164 | 10/1986 |
| JP | 0044662 | 2/1989 |
| JP | 0080717 | 4/1991 |
| JP | 08130592 A | 5/1996 |
| JP | 09018584 A | 1/1997 |

OTHER PUBLICATIONS

Arndt et al., "International Standards on Universal Personal Telecommunications: State of the Art and Future Projections", ICUPC '92 Proceedings, Oct. 1992 pp. 03.01/1–03.01/5.

Zoreda et al., *Smart Cards*, Artech House, pp. 158–160 and 173–175 (1994).

Crump, Jr., Stewart, Phone Service in Airplanes: A High-Flying Idea, Mobile Office, Apr. 1992, pp. 54–68.

Snow, Richard "'The Future': GSM–features versus the cost (cellular radio)" IEE Colloquium on Mobile Communications, pp. 511–513, 1990.

Mazziotto, "The Subscriber Identity Module for The European Digital Cellular System GSM," Centre National d'Etudes des Télécommunications, France Telecom, France.

ETSI/TC SMG, "Subscriber Identity Modules, Functional Characteristics," GSM 02.17, Version 3.2.0, Feb., 1992.

ETSI TC–SMG, European Telecommunication Standard, "European Digital Cellular Telecommunications System (Phase 2); Subscriber Identity Modules (SIM) Functional Characteristics," European Telecommunications Standards Institute, ETSI Secretariat, F–06921 Sophia Antipolis Cedex France, 1994.

Work Programme—Work Item Schedule Detailed Report, Work Programme, "Details of GSM 11.11 Work Item Schedule," Sep. 2, 2004.

GSM 11.11, ETSI PT12, "Specifications of the SIM–ME Interface," Jul. 1994.

Walker, Michael, "Security in Mobile and Cordless Telecommunications" CompEuro 92, 'Computer Systems and Software Engineering', Proceedings, pp. 493–496, May 1992.

Arndt, G. et al., "International Standards on Universal Personal Telecommunications: State of the Art and Future Projections", ICUPC 92 Proceedings, Oct. 1992 pp. 03.01/1–03.01/5.

Jose Luis Zoreda and Jose Manuel Oton, *Smart Cards*, Artech House, pp. 158–160 and 173–175 (1994).

Crump, Jr., Stewart, Phone Service in Airplanes: A High-Flying Idea, Mobile Office, Apr. 1992, pp. 54–68.

Snow, Richard "'The Future': GSM–features versus the cost (cellular radio)" ISS Colloquium on Mobile Communications, pp. 511–513, 1990.

* cited by examiner

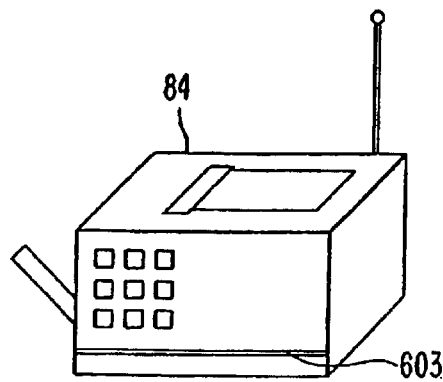
_Fig. 14_
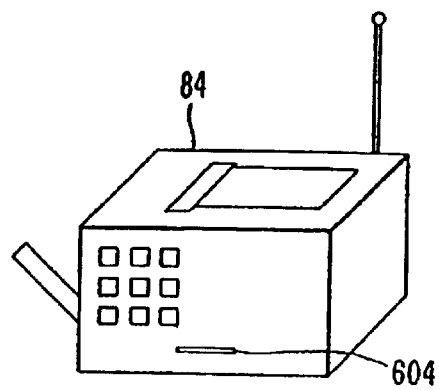
_Fig. 15_
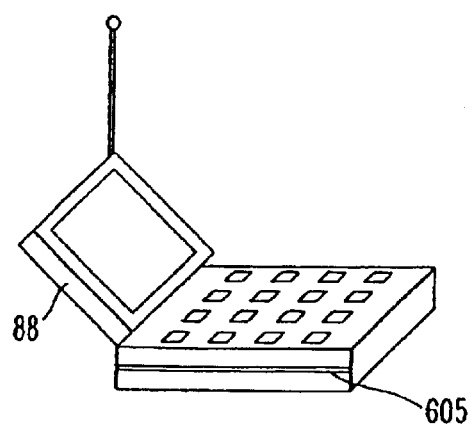
_Fig. 16_
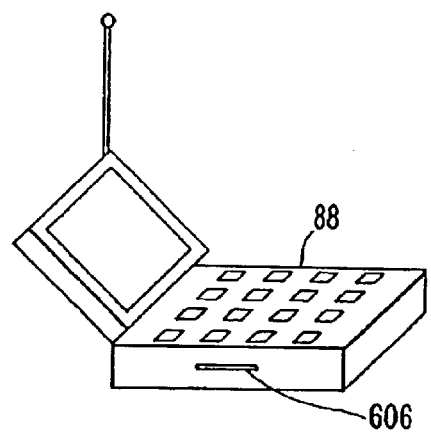
_Fig. 17_
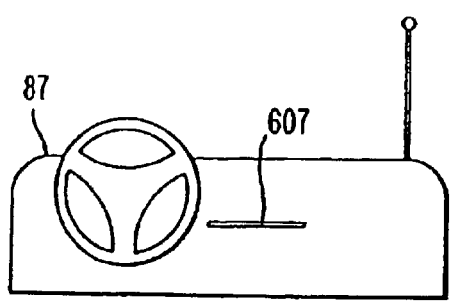
_Fig. 18_
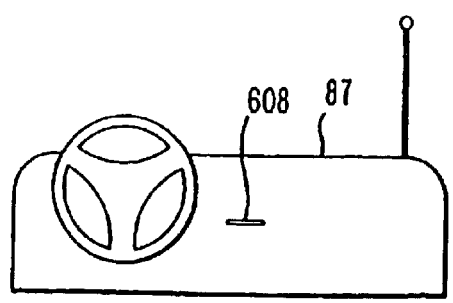
_Fig. 19_

REMOVABLE CARD FOR USE IN A RADIO UNIT

CROSS REFERENCE TO RELATED APPLICATION(S)

This application is a continuation of U.S. patent application Ser. No. 10/073,544, filed Feb. 11, 2002, now U.S. Pat. No. 6,651,883, which is a continuation of U.S. patent application Ser. No. 09/886,497, filed Jun. 21, 2001, which issued on May 7, 2002 as U.S. Pat. No. 6,382,507, which is a continuation of U.S. patent application Ser. No. 09/671,917, filed Sep. 28, 2000, which issued on Sep. 18, 2001 as U.S. Pat. No. 6,290,127, which is a continuation of U.S. application Ser. No. 09/421,733, filed Oct. 20, 1999, which issued on Jan. 9, 2001 as U.S. Pat. No. 6,170,745, which is a continuation of U.S. application Ser. No. 08/954,788, filed Oct. 21, 1997, which issued on Dec. 21, 1999 as U.S. Pat. No. 6,003,770, which is a continuation of U.S. application Ser. No. 08/685,595, filed Apr. 26, 1996, abandoned, which is a continuation of U.S. application Ser. No. 08/281,705, filed Jul. 28, 1994, abandoned, which is a divisional of U.S. application Ser. No. 07/956,851, filed Oct. 6, 1992, which issued on Oct. 25, 1994 as U.S. Pat. No. 5,359,182.

BACKGROUND

This invention relates to wireless debit cards, and more particularly to the application of a wireless debit card to a radio telephone system.

DESCRIPTION OF THE RELEVANT ART

Credit cards, debit cards, point of sale (POS) cards, automatic teller machine (ATM) cards, declining balance cards, and the like have been used in the art for some time. In operation with the telephone networks, credit cards termed calling cards are available where a user with an account uses the calling card to access the telephone network. In accessing the telephone network, the calling card may be inserted through the slot of a telephone to a card reader, or alternatively, an account number on the card may be entered in the telephone, for example, by a touch-tone keypad. In either case, the amount of the telephone call is charged to the user's calling card account for later payment.

Similarly, a user may purchase a debit card for a certain amount of credit for purchases and charges. For example, charges to telephone calls, with the credit allocated to the debit card, are deducted from the amount of credit purchased. In use, the user inserts the debit card into a pay telephone and the available credit on the debit card is debited for the amount used.

A problem with prior art debit card and credit card systems is that the debit/credit card systems have generally been limited to the existing fixed position telephone network, with the debit/credit card systems relying primarily on fixed telephones and general purpose pay telephones for initiating telephone calls.

In addition, the existing card storage systems provide for identification data and other data to be stored on the card, for example, by using magnetic strips to be read by a magnetic swipe reader. Existing smartcards and future card storage systems promise to provide greater detail regarding the card user, with the greater detail stored on a card having greater storage capacity, for example, a card including one or more computer chips having a memory. The computer chips may also include microprocessors in addition to the memory, with the microprocessors allowing the user with the debit/credit card to access computer systems with the debit/credit card. Furthermore, the use of the computer chips with memories allows the storage and access of data beyond user identification; for example, computer chips can include user addresses and telephone numbers, credit and debit account histories, and available credit and debit limits.

However, the prior art has limited the use of the card storage systems to fixed pay telephones having card readers, primarily by magnetic swipe readers reading debit/credit cards with magnetic strips. In the prior art, telephones without card readers, for example, non-pay telephones and mobile cellular telephones, can only access the existing telephone network using debit/credit cards by entering an account number and/or a personal identification number (PIN) in the telephone. The advantages of developments in card storage systems to hold greater information about the user and the user's account activities are unable to be fully implemented by the prior art.

Furthermore, debit/credit card systems used in conjunction with the existing telephone networks are limited to the accessing of the telephone network to make telephone calls. The prior art does not provide for the reception of telephone calls to users accessing the telephone network with a credit card or debit card, unless the user leaves the telephone number of the telephone being accessed with a listener. In addition, some pay telephones may not be permitted, by the operating telephone company, to send calls to the pay telephones, i.e. some pay telephones allow calls out from the pay telephone but do not allow calls in to the pay telephone, since the telephone company does not receive payment for calls in to the pay telephone in the same manner as payment for calls out from the pay telephone.

The present telephone network switches telephone calls for a user to fixed telephone numbers with the fixed telephone numbers allocated to specific telephones, so a user is limited to receiving telephone calls to fixed telephone numbers and to specific telephones. The prior art does not provide for the automatic switching of telephone calls to users, especially travelers, at telephones which are not allocated to the users.

Moreover, present debit/credit card systems have been limited in application to merchant point of sale (POS) applications and to the described uses with telephones. Other consumer electronic applications, for example, personal computers, facsimile machines, and automobiles would also benefit from a wireless debit card system in providing a debit card system free from specifically allocated telephone numbers.

SUMMARY

A removable card is used in radio units. The card comprises a memory for storing telephone numbers associated with an owner of the card. One of the telephone numbers is a telephone number of the owner. The memory is configured so that upon insertion of the card in a radio unit, that radio unit receives calls associated with the owner telephone number stored on the card.

BRIEF DESCRIPTION OF THE DRAWING(S)

The accompanying drawings, which are incorporated in and constitute a part of the specification, illustrate preferred embodiments of the invention, and together with the description serve to explain the principles of the invention.

FIGS. 14–15 illustrate embodiments of radio facsimile machines having slots for a debit card;

FIGS. 16–17 illustrate embodiments of radio personal computers having slots for a debit card; and FIGS. 18–19 illustrate embodiments of the dashboards of automobiles having slots for a debit card.

DETAILED DESCRIPTION OF THE PREFERRED EMBODIMENT(S)

Figure 1:
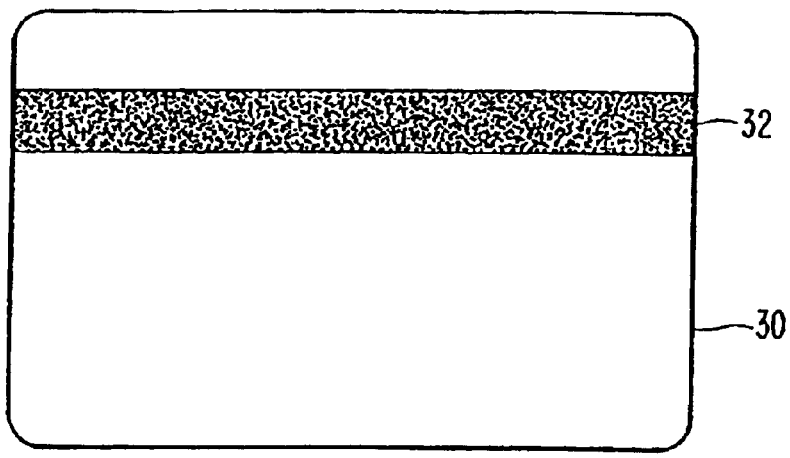
FIG. 1 shows a prior art debit/credit card having a magnetic strip.

Reference now is made in detail to the present preferred embodiments of the invention, examples of which are illustrated in the accompanying drawings, wherein like reference numerals indicate like elements throughout the several views.

As illustratively shown in FIG. 1, a prior art debit/credit card 30 having a magnetic strip 32 permits the user or cardholder to access a debit/credit card system by passing the debit/credit card 30 pass through or by having the debit/credit card 30 swiped through a magnetic card reader to read the information stored in a magnetic format on the magnetic strip 32. In addition, although the magnetic strips 32 are primarily used to encode and store identifying information, for example, as a debit/credit card account number, the magnetic strips 32 may also be used to encode and store additional information beyond identification information; for example, available credit and debit limits may be encoded and stored on the magnetic strip 32. A debit/credit card 30 with a magnetic strip 32 may be used repeatedly in any compatible magnetic strip reader, and the magnetic strip 32 may further be rewritten by any compatible magnetic strip reader which is also equipped with a magnetic strip writer capable of encoding different or updated information in a magnetic format onto the magnetic strip 32 of the debit/credit card 30.

The use of debit/credit cards in commerce is widespread, and further applications of debit/credit cards are being implemented. Some applications may utilize debit/credit cards called smartcards, with smartcards being capable of storing greater amounts of information and capable of accessing more diverse consumer applications. In the prior art, some debit/credit smartcards 34 are equipped with computer chips 36 having memories, as illustratively shown in FIG. 2. In use, the user places the debit/credit smartcard 34 into a compatible card accessing device to read and access the information stored in the memory of the computer chip 36. The computer chips 36 are not limited to using silicon chips, and the computer chips 36 may further be equipped with microprocessors including or in addition to the memories. Furthermore, the computer chips 36 may also be equipped with minute batteries or energy cells, allowing for volatile memories to be used to store the information in the memory and, therefore, on the debit/credit smartcard 34.

The debit/credit cards 34 with computer chips 36 having memories may also be rewritten by a compatible accessing device equipped with a processor capable of writing and rewriting information to the memory of the computer chip 36 on the debit/credit card 34.

The use of the computer chips with memories allows the storage and access of data not limited to user identification; for example, the computer chips can include user addresses and telephone numbers, credit and debit account histories, and available credit and debit limits.

The existing debit/credit card systems primarily employ debit/credit card readers/writers accessing debit/credit account databases through the existing telephone networks using modems connecting the debit/credit card readers/writers to the telephone networks, for example, as public switched telephone networks (PSTN).

Figure 3:
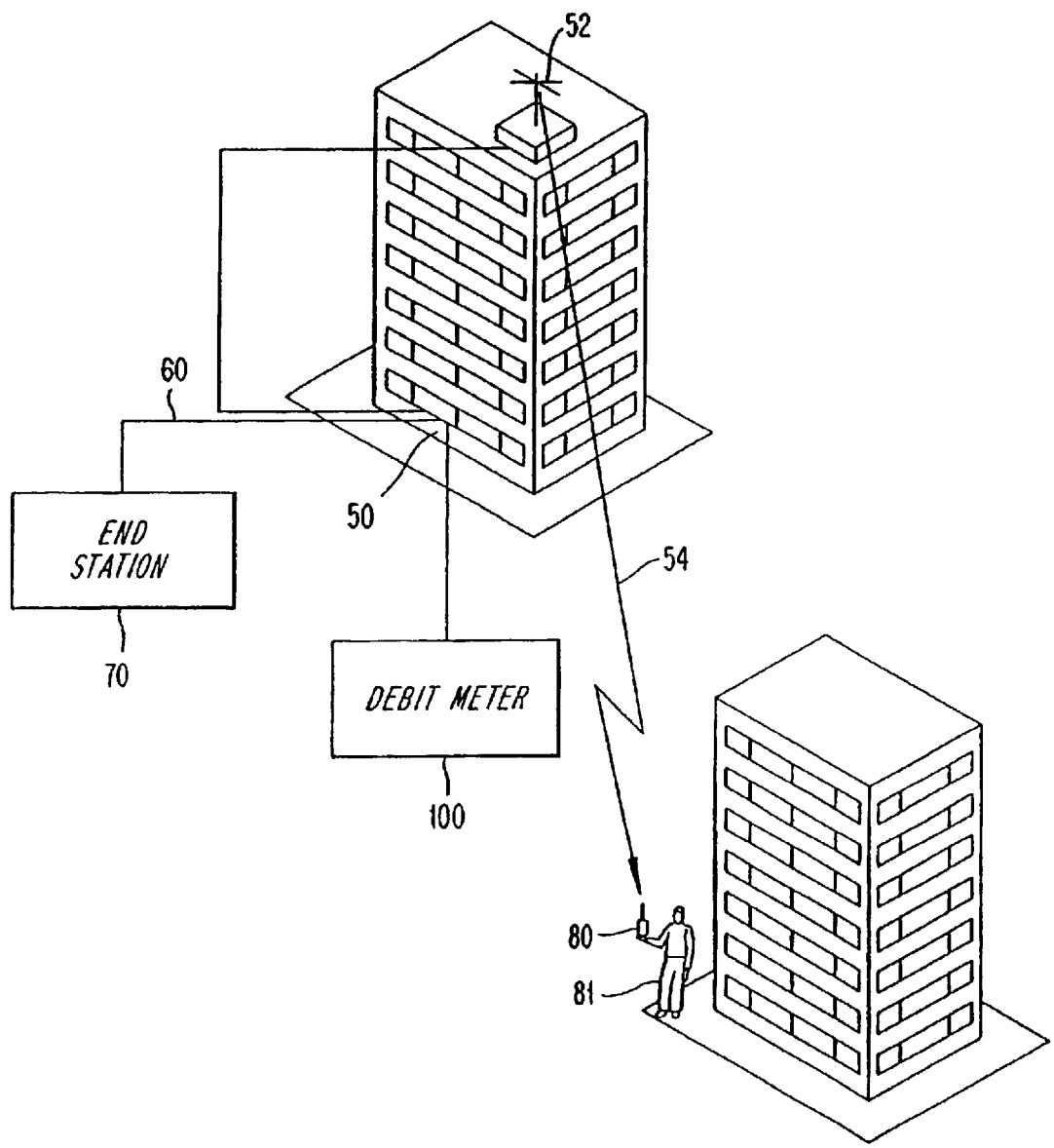
FIG. 3 shows a wireless debit card system with a user having a radio unit accessing a base station.

In the exemplary arrangement shown in FIG. 3, the wireless debit card system is shown comprising at least one radio unit 80, at least one base station 50, and at least one end station 70. Each end station 70 typically has a communications switch, and the end station 70 may be embodied as an end office; for example, a class 5 office. Each of the radio units 80 typically has means for reading a credit amount and a personal access number stored on a debit card. Each of the radio units 80 also has means for communicating, using radio waves, the credit amount and the personal access number as a credit signal. The credit signal may further include synchronization data. The base stations 50 receive the credit signal from each of the radio units 80 and relay the credit signal over a communications channel 60 to the end stations 70. Each end station 70 has a communications switch which is responsive to receiving a plurality of credit signals. In response to receiving the plurality of credit signals, the communications switch allocates the credit amount for each radio unit, and the communications switch also sets, within the communications switch, the personal access number for each debit card for each radio unit 80. A communications channel identified with each personal access number is assigned a path through the base station 50.

As shown in FIG. 3, the base station 50 may be embodied as a commercial place of business, for example, a candy store, a bodega, or a department store, with an antenna 52 coupled to the base station 50. The base station 50 transmits and receives signals to and from a radio unit 80 of a user 81, respectively, using radio waves 54 over broadcast channel frequencies. Furthermore, in the preferred embodiment, the wireless debit card system may further include a debit meter 100 operatively coupled to the base station 50, as shown in FIG. 3.

Figure 4:
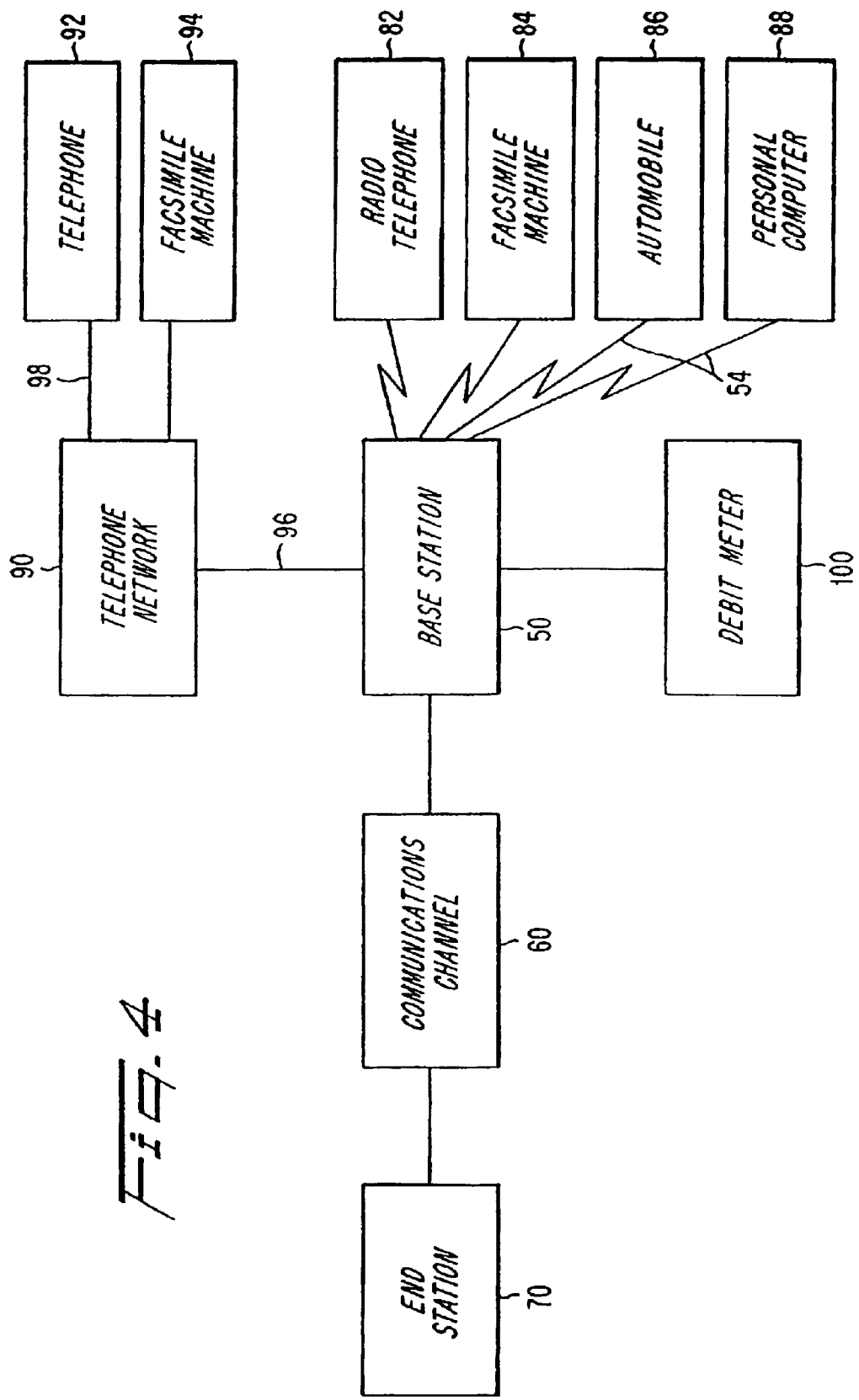
FIG. 4 shows an alternate embodiment of the wireless debit card system with various electronic devices accessing the wireless debit card system via radio waves and wired connections.

In an alternate embodiment, as illustrated in FIG. 4, the wireless debit card system may be embodied as a base station 50, a communications channel 60, an end station. 70,. and various radio units, with the radio units embodied as, for example, a radio telephone 82, a facsimile machine 84, an automobile 86, and a personal computer 88, with each of the radio units 82, 84, 86, 88 capable of transmitting and receiving radio frequencies. Each of the radio units 82, 84, 86, 88 communicates with the base station 50 via radio waves 54 over broadcast channel frequencies. The wireless debit card system may further include a debit meter 100 operatively coupled-to the base station 50. At the time of purchase of the debit card and/or the radio unit 80, the debit card to be used with the radio unit 80 may have an initial credit amount and an initial personal access number stored on the debit card.

As the radio units 80 may be embodied as radio telephones, radio facsimile machines, and the like, and as the base station 50 may be coupled to devices connected through telephone lines, for example, fixed wire telephones, mainframe computers, and the like, the personal access number of the debit card may be used as a telephone number, or the personal access number may encode or incorporate telephone numbers into the personal access number, existing telephone numbers, telephone lines, and telephone accounts may operate in conjunction with the wireless debit card system.

Moreover, as illustrated in FIG. 4, the base station 50 may further be coupled to other devices, for example, telephone 92 and facsimile machine 94, through a telephone network 90, where devices, which may include a telephone 92 and a facsimile machine 94, are coupled to the telephone network 90 by telephone wires 98, and where the base station 50 is coupled to the telephone network by telephone wires 96. The wireless debit card system, as embodied in FIG. 4, allows both wireless and wired devices to access the base station 50.

Figure 5:
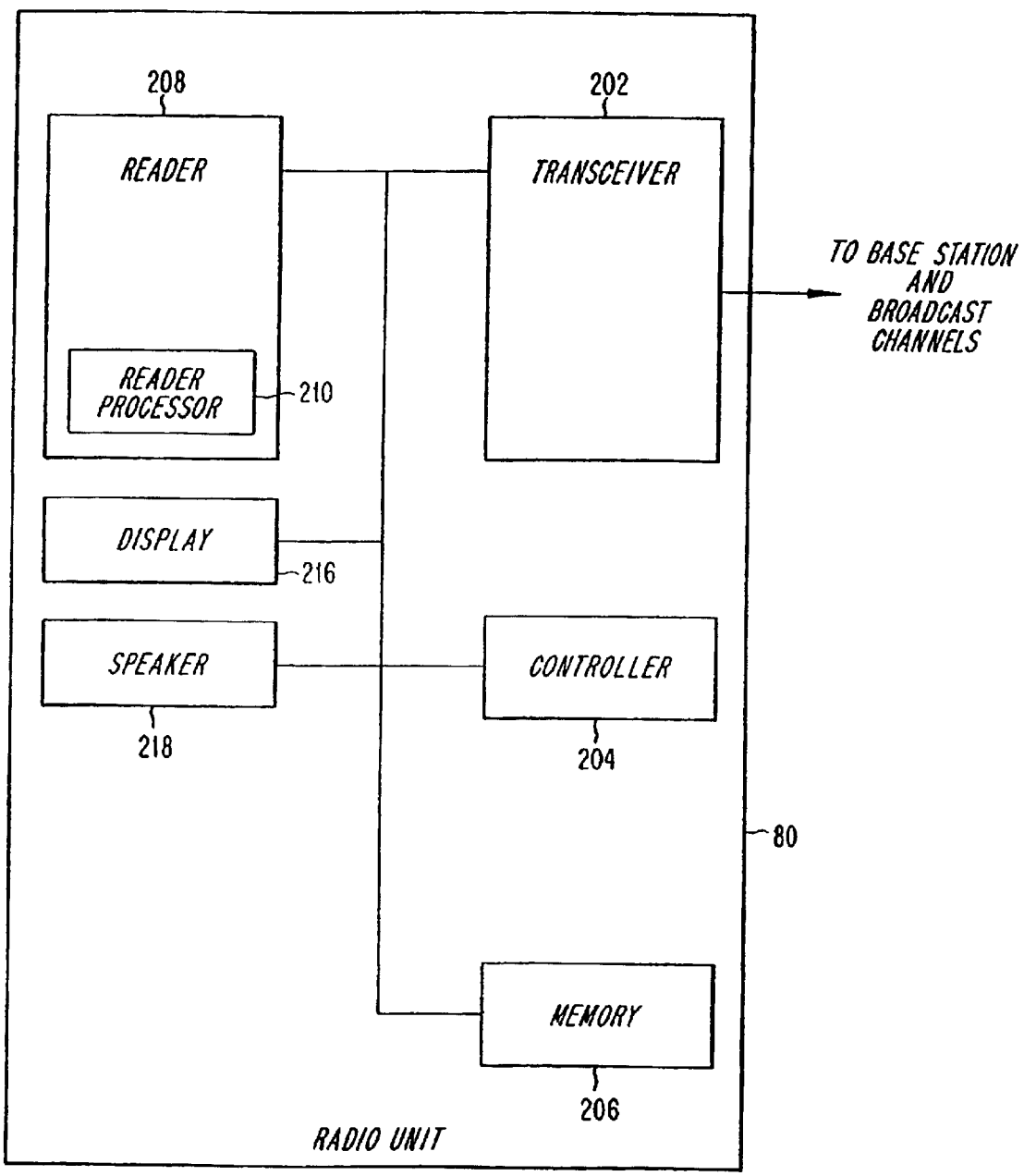
FIG. 5 illustrates a radio unit of the present invention.

As shown in FIG. 5, each radio unit 80 in the wireless debit card system includes a first processing means, means for reading a credit amount and a personal access number from a debit card, and means for communicating the credit amount and the personal access number as a credit signal. The first processing means may be embodied as a controller 204 which may perform processing functions as a first processor for generating a credit signal from the credit amount and from the personal access number. The communicating means may be embodied as a transceiver 202, and the reading means may be embodied as reader 208. The transceiver 202 includes an antenna, and the transceiver 202 is operatively coupled to the base station 50 via radio waves over broadcast channels, and the transceiver 202 communicates with the base station 50 and with other devices over the broadcast channel frequencies.

The user accesses the wireless debit card system by accessing the radio unit 80 with the debit card by inserting the debit card into a slot in the radio unit 80. The radio unit 80 may also include memory 206 for storing the credit amount and the personal access number after the credit amount and the personal access number are read by the reader 210 of the radio unit 80.

For use with a debit card 30 with a magnetic strip 32, as shown in FIG. 1, the reader 208 of radio unit 80 may include a magnetic reader for reading the credit amount and the personal access number from the magnetic format of the magnetic strip 32 of a debit card 30.

Figure 2:
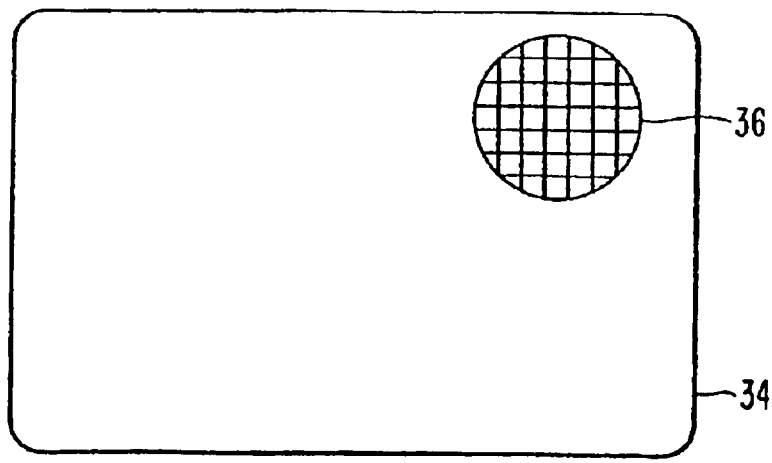
FIG. 2 shows a prior art debit/credit card having a computer chip with a memory.

For use with a debit card 34 with a computer chip 36 having a memory, for example, smartcards, as shown in FIG. 2, the reader 208 of radio unit 80 may include a reader processor 210 for reading the credit amount and the personal access number from the memory of the computer chip. The operation of the wireless debit card system is not dependent on the format of the information storage on the debit cards, so magnetic strip cards and smartcards may both be used in the wireless debit card system, where magnetic strip cards and smartcards are read by compatible debit card readers included in the radio units.

Figure 6:
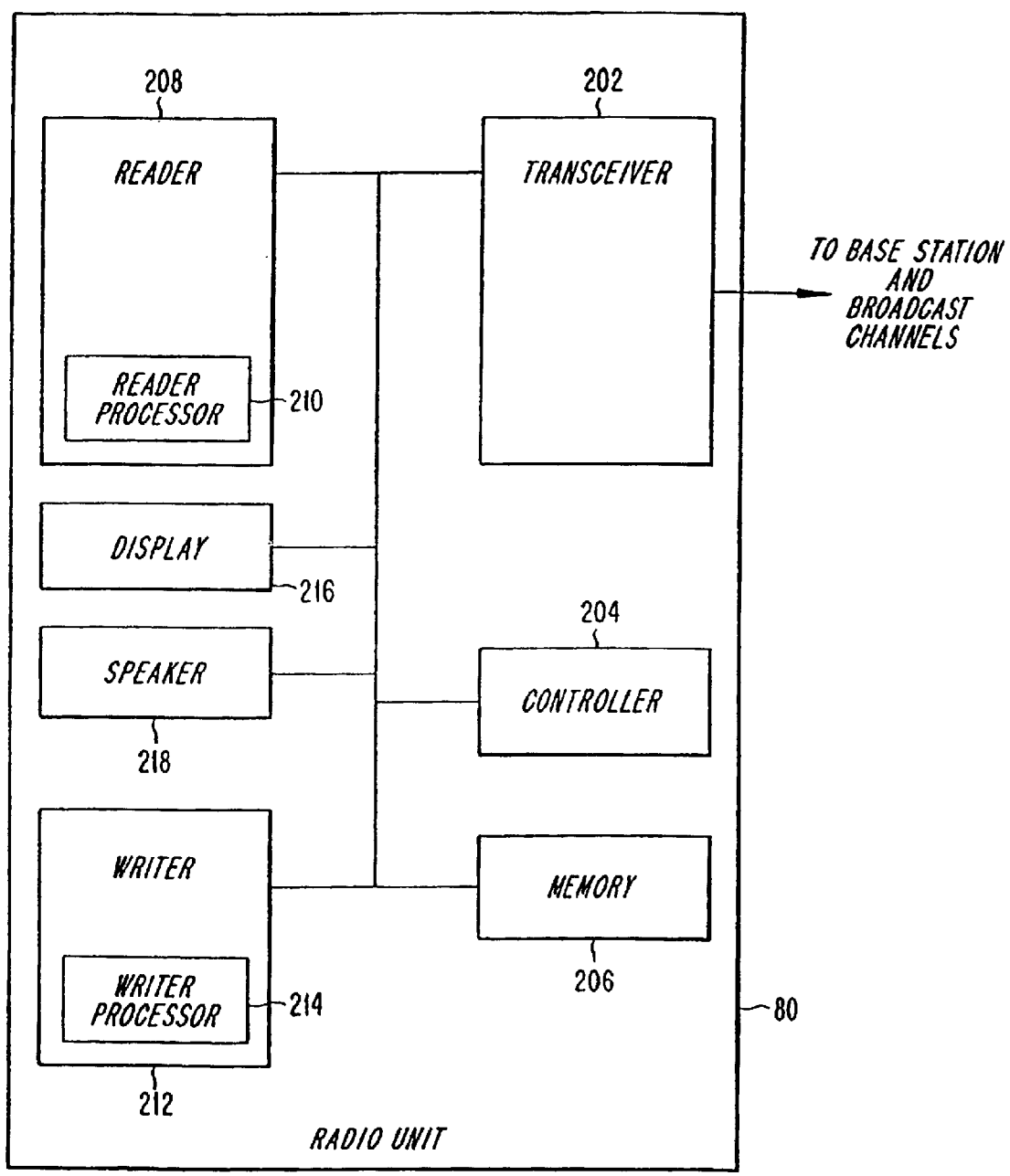
FIG. 6 illustrates an alternate embodiment of the radio unit of the present invention.

As shown in FIG. 6, the radio unit 80, in an alternate embodiment, may further include changing means, embodied as writer 212 using controller 204 and memory 206, for changing the credit amount of the debit card. The writer 212 may also change the personal access number of the debit card.

For use with a debit card 30 with a magnetic strip 32, as shown in FIG. 1, the writer 212 of radio unit 80 may include a magnetic writer for writing the credit amount and the personal access number from the magnetic format of the magnetic strip 32 of a debit card 30.

For use with a debit card 34 with a computer chip 36 having a memory, for example, smartcards, as shown in FIG. 2, the writer 208 of radio unit 80 may include a writer processor 214 for writing and/or rewriting the credit amount and the personal access number to the memory of the computer chip. The operation of the wireless debit card system is not dependent on the strip cards and smartcards may both be used rewritten in the wireless debit card system, where magnetic strip cards and smartcards are written and/or rewritten by compatible debit card readers included in the radio units.

Figure 10:
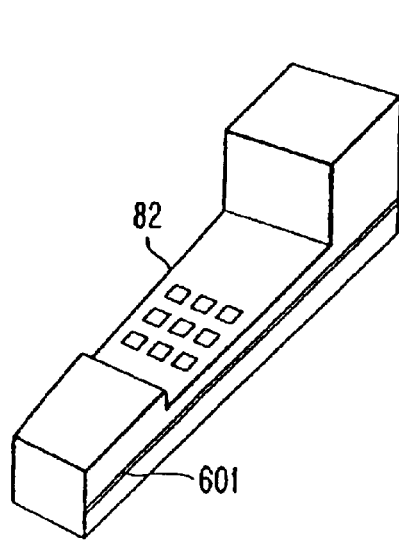
FIGS. 10–13 illustrate embodiments of radio telephones having slots for a debit card.
Figure 11:
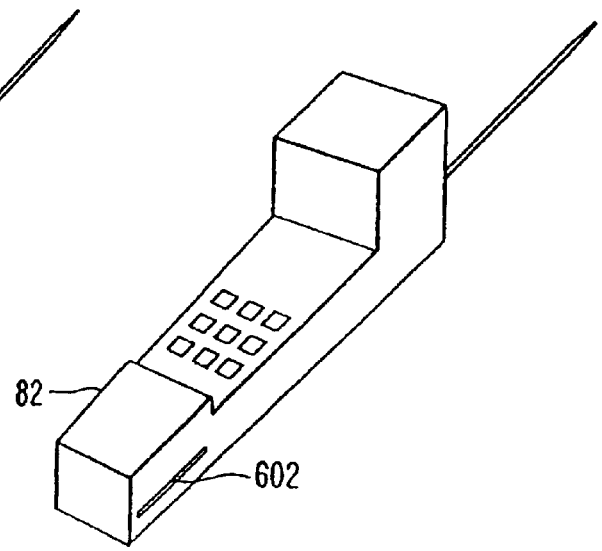
Figure 12:
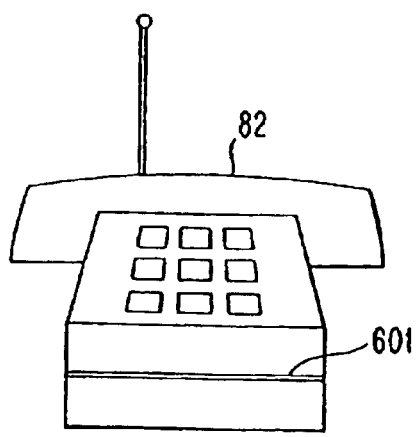
Figure 13:
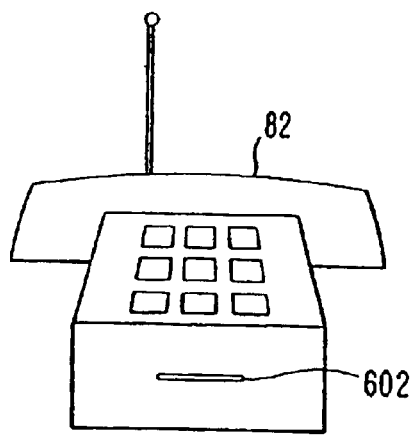

The radio unit 80 includes an antenna, connected to the transceiver, which may be internal or external. The radio unit 80 may be embodied as a radio telephone 82, as shown in FIGS. 10 and 12, where each radio telephone 82 includes a swipe slot 601 for swiping the debit card through the reader 208 and through the writer 212 of the radio telephone. In alternate embodiments, as shown in FIGS. 11 and 13, each radio telephone 82 includes an insertion slot 602 for inserting the debit card into the reader 208 and into the writer 212 of the radio telephone 82.

The radio units may also include radio facsimile machines, as illustrated in FIGS. 14–15 may also include radio personal computers, for example, radio laptop computers, as illustrated in FIGS. 16–17, and may also include automobiles, as illustrated in FIGS. 18–19, with each of the radio personal computers, radio facsimile machines, and automobiles including an antenna and slots for the debit cards. FIG. 14 shows a radio facsimile machine 84 width a swipe slot 603 to swipe a debit card with a magnetic strip through a magnetic reader/writer of the radio facsimile machine 84, while FIG. 15 shows a radio facsimile machine 84 with an insertion slot 604 to insert a debit card into the reader/writer of the radio facsimile machine 84. Similarly, FIGS. 18 and 19 show the dashboard 87 of an automobile, with the dashboard 87 equipped with a swipe slot 607 and with an insertion slot 608, respectively, for swiping or inserting the debit card into the reader/writer of the automobile.

The debit card stores a credit amount and a personal access number, width the debit card storing the credit amount and the personal access number on a magnetic strip in a magnetic format or in a computer chip with a memory. A user accessing a radio unit 80 width the debit card by inserting the debit card into the reader 208 of the radio unit 80. The reader 208 reads the credit amount and the personal access number from the debit card, and the controller 204 generates a credit signal from the credit amount and the personal access number. The transceiver 202 transmits the credit signal over broadcast frequencies, using radio waves, to a bade station 50.

Furthermore, as shown in FIGS. 5 and 6, each radio unit 80 may further include display means for displaying the credit amount of the debit card. The display means may be embodied as a display 216, as shown in FIGS. 5 and 6, respectively. The display means may also display the personal access number of the debit card. In addition, the first processing means, embodied as controller 204, may also store the credit amount as a count in a counter, and may deduct charges for use of the radio unit 80 by decreasing the count as the charges are incurred by the user. The first processing means, embodied as controller 204, may further send the count to the display means for display to the user to indicate to the user the present amount of credit available as the user incurs charges against the previously purchased credit amount.

In addition, etch radio unit 80 may further include audio means for producing sounds. As shown in FIGS. 5 and 6, the audio means may be embodied as a speaker 218, since the radio unit 80 may be embodied as a radio telephone, as a radio facsimile machine, as a radio personal computer, or as an automobile, and since telephones, facsimile machines, personal computers, and automobiles usually provide audio means embodied as speakers. The controller 204 may generate a warning signal to indicate when the count has decreased below, or crosses, a predetermined threshold; therefore, the warning signal is produced when the available credit fox the debit card has reached a low level and requires an increase in the credit amount for further use of the radio unit 80. Alternately, the controller 204 may generate the warning signal to indicate when the count has decreased to zero to indicate that tie debit card does not have any available credit for further charges by the user on the radio unit 80.

In response to the warning signal from the controller 204, the speaker 218 emits one or more sounds to indicate that the credit of the debit card is low, using a low credit warning sound, or that the credit of the debit card has run out, using a zero credit warning sound. The audio means may further include synthesizer means, embodied as a voice synthesizer, for generating synthesized voice messages, permitting the low credit warning sound and the zero credit warning sound to include synthesized voice messages to convey to the user the amount of available credit, the lack of available credit, or other voice messages.

The base station 50 receives the broadcasted credit signal, and responds to receiving the credit signal by relaying the credit signal over a communications channel 60 to an end station 70, as shown in FIGS. 3 and 4. The communications channel 60 may be embodied as a telephone network, with both the base station 50 and the end station 70 being coupled to the telephone network by telephone lines. Therefore, the wireless debit card system may easily be connected with the existing telephone networks, and also may be easily implemented in commercial places of business; for example, a base station 50 may be installed in a telephone jack in a candy store, a bodega, or a department store.

In addition, the communications channel 60 may alternately be embodied as a wireless communications system with the base station 50 and the end station 70 broadcasting over radio frequencies.

Figure 7:
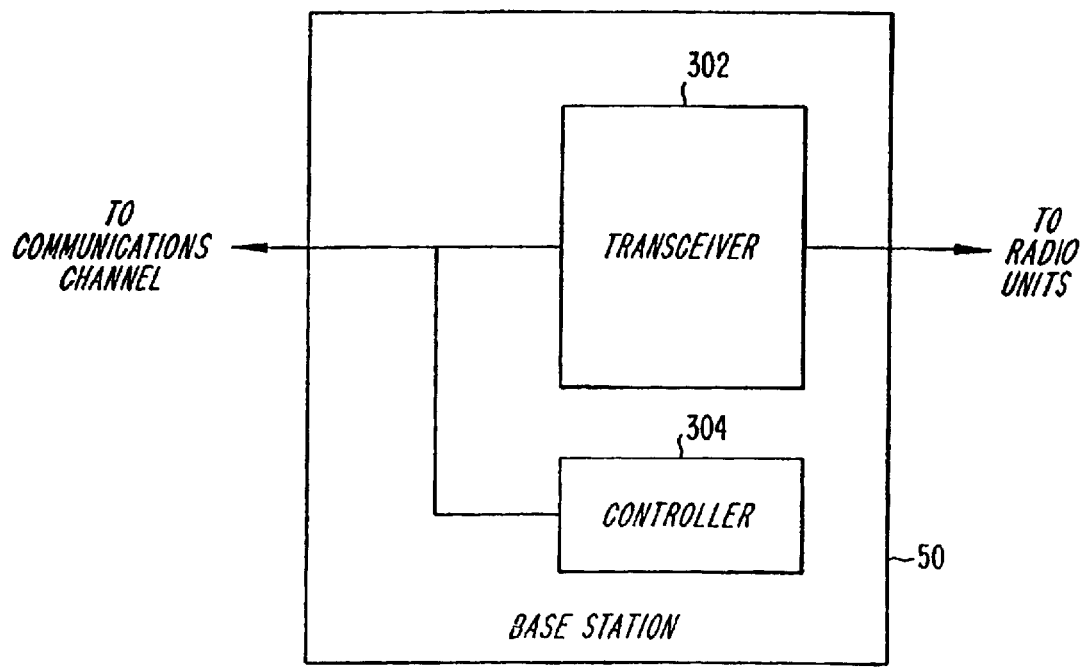
FIG. 7 illustrates a base station of the present invention.

As illustrated in FIG. 7, the base station 50 includes a transceiver 302 and a controller 304. As shown in FIG. 3, the base station 50 may be located at a commercial place of business, for example, a candy store, a bodega, or a department store, with an antenna 52 coupled to the base station 50, and the base station 50 relays the credit signal over a communications channel 60 to an end station 70, as shown in FIGS. 3 and 4. As shown in FIG. 3, the antenna 52 may be installed on the roof of the commercial place of business.

Figure 8:
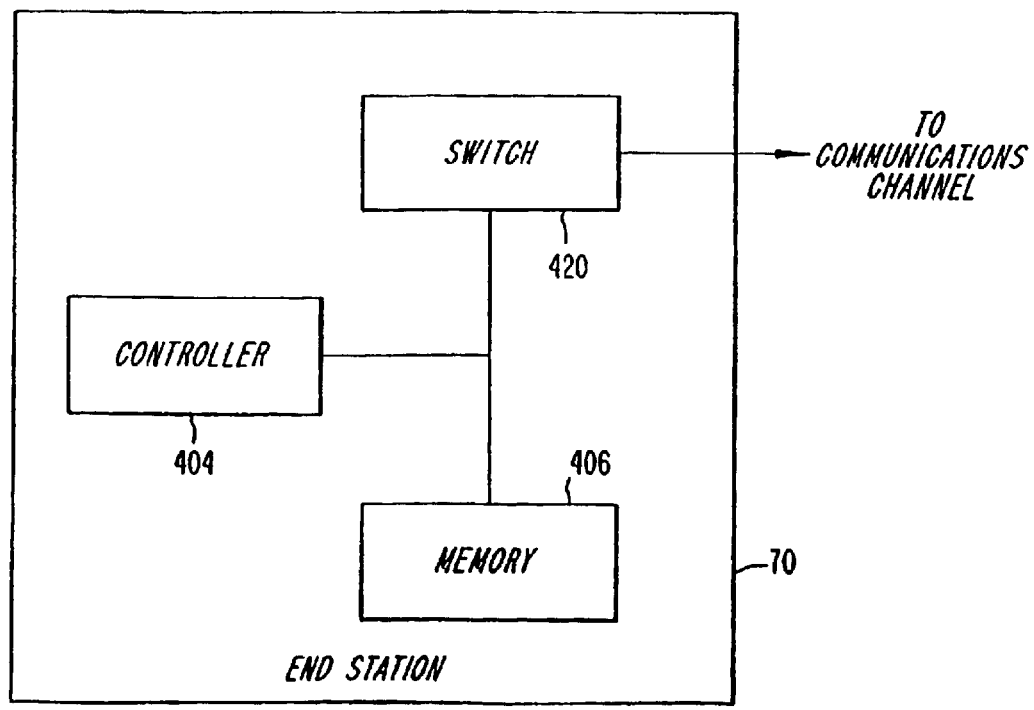
FIG. 8 shows an end station of the present invention.

As illustrated in FIG. 8, the end station 70 includes a communications switch 420, a controller 404, and a memory 406. The communications switch 420 is responsive to the credit signal from a radio unit 80 for generating a first control signal to allocate the credit amount of the debit card to the radio unit 80, and the first control signal is also used to set a radio unit access number of the radio unit 80 to the personal access number of the debit card. The end station 70 establishes and uses a communications path through the base station 50 to send the first control signal to the radio unit 80.

In response to the first control signal from the end station 70, the radio unit 80 allocates the credit amount of the debit card to the radio unit 80, and radio unit 80 sets a radio unit access number of the radio unit 80 to the personal access number of the debit card.

The wireless debit card system further includes having the end station 70 generate a second control signal for changing the credit amount of the debit card after the credit amount to the debit card has been set. In response to the second control signal, the changing means of the radio unit 80 changes the credit amount of the debit card. In a further embodiment, the changing means of the radio unit 80, in response to the second control signal, changes the personal access number of the debit card. In changing the credit amount and the personal access number of the debit card, the changing means of the radio unit 80, embodied as writer 212 using controller 204 and memory 206, using data from the second control signal, revises the credit amount and the personal access number, respectively, stored in memory 206. In revising the credit amount and the personal access number, the controller 204 generates an updated credit amount and an updated personal access number, respectively. The changing means thee stores the updated credit amount and the updated personal access number, respectively, on the debit card.

For use with, debit card 30 with a magnetic strip 32, as shown in FIG. 1, the writer 212 of radio unit 80 may include a magnetic writer for writing and/or rewriting the credit amount and the personal access number from the magnetic format of the magnetic strip 32 of a debit card 30.

For use with a debit card 34 with a computer chip 36 having a memory, for example, smartcards, as shown in FIG. 2, the writer 212 of radio unit 8 may include a writer processor 214 for writing and/or rewriting the credit amount and the personal access number to the memory of the computer chip 36. The operation of the wireless debit card system is not dependent on the format of the information storage on the debit cards, so magnetic strip cards and smartcards may both be used and rewritten in the wireless debit card system, where magnetic strip cards and smartcard are read by compatible debit card readers included in the radio units.

Figure 9:
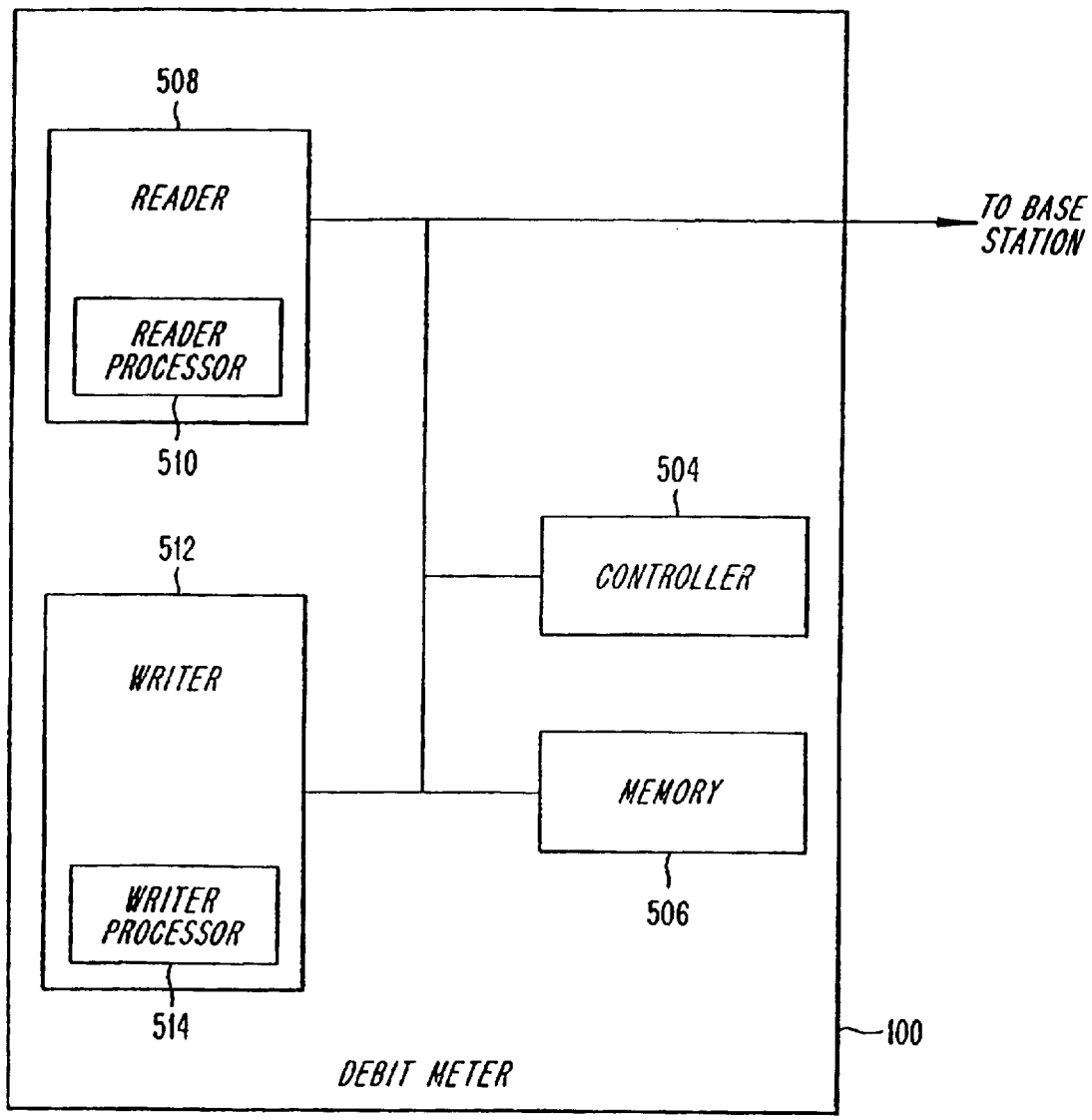
FIG. 9 shows a debit meter of the present invention.

As shown in FIGS. 3 and 4, the wireless debit card system may include a debit meter 100 coupled to the base station 50. FIG. 9 shows the de bit meter 100 with storing means for storing a credit amount and a personal access number of the debit card, and changing means for changing the credit amount of the debit card. The changing means may also change the personal access number of the debit card. the preferred embodiment shown in FIG. 9, the storing means is embodied as a memory 506, and the changing means is embodied as a waiter 512 using controller 504 and memory 506.

In response to a second control signal from the end station 70, the debit meter 100 changes the credit amount of the debit card using the writer 512. Also, in response to the second control signal from the end station 70, the debit meter 100 may change the personal access number of the debit card using the writer 512.

For use with a debit card 30 with a magnetic strip 32, as shown in FIG. 1, the writer 512 of debit meter 100 may include a magnetic writer for writing and/or rewriting the credit amount and the personal access number from the magnetic format of the magnetic strip 32 If the debit card 30.

For use with a debit card 34 with a computer chip 36 having a memory, for example, smartcards, as shown in FIG. 2, the writer 512 of debit meter 100 may include a writer processor 214 for writing and/or rewriting the credit amount and the personal access number to the memory of the computer chip 36. The operation of the wireless debit card system is not dependent on the format of the information storage on the debit cards, so magnetic strip cards and smartcards may both be used and rewritten in the wireless debit card system, where magnetic strip cards and smartcards are written and/or rewritten by a compatible debit card writer included in the debit meter 100.

The debit meter 100 may further include meter processing means for processing the credit amount and the personal access number of a debit card. The meter processing means is embodied as a controller 504 in FIG. 9, which may perform processing functions as a meter processor. In addition the debit meter 100 may further include reading means, which may be embodied as a reader 508, for reading the credit amount and the personal access number of the debit card.

For use with debit card 30 with a magnetic strip 32 as shown in FIG. 1, the writer 508 of debit meter 100 may include a magnetic reader for reading the credit amount and the personal access number from the magnetic format of the magnetic strip 32 of the debit card 310.

For use with a debit card 34 with a computer chip 36 having a memory, for example, smartcards, as shown in FIG. 2, the reader 508 of debit meter 100 may include a reader processor 510 for reading the credit amount and the personal access number from the memory of the computer chip 36. The operation of the wireless debit card system is not dependent on the format of the information storage on the debit cards, so magnetic strip cards and smartcards may both be used in the wireless debit card system, where magnetic strip cards and smartcards are read by compatible debit card readers included in the radio units.

The debit meter 100 may also include a swipe slot for swiping the debit card through the writer 512 of the debit meter 100. In alternate embodiments, the debit meter 100 may include an insertion slot for inserting the debit card into the reader 508 and writer 512 of the debit meter 100.

The wireless debit card system further includes having the end station 70 generate a second control signal for changing the credit amount of the debit card after the credit amount to the debit card has been set. In response to the second control signal, the changing means of the debit meter 100 changes the credit amount of the debit card. In another embodiment, the changing means of the debit meter 100, in response to the second control signal, changes the personal access number of the debit card. In changing the credit amount and the personal access number of the debit card, the changing means of the debit meter 100, embodied as writer 512 using controller 504 and memory 506, using data from the second control signal, revises the credit amount and the personal access number, respectively, stored in memory 506. In revising the credit amount and the personal access number, the controller 504 generates an updated credit amount and an updated personal access number, respectively. The changing means then stores the updated credit amount and the updated personal access number, respectively, on the debit card.

In the preferred embodiment, the debit meter 100 of FIG. 9 is used with the radio units 80 as embodied in FIG. 5, so that the debit meter 100 may perform the functions of changing and writing/rewriting the credit amount and the personal access number of the debit card, while the radio units 80 embodied in FIG. 5 of the wireless debit card system need not be equipped with writing means. On the other hand, radio units 80 embodied in FIG. 6, may be equipped with changing means, perform the functions of the de bit meter 100, so that the wireless debit card system need not be equipped with a debit meter 100. Still further, the wireless debit card system may include the radio units 80 of FIG. 5, the radio units 80 of FIG. 6, and the debit meter 100 of FIG. 9, allowing debits cards to be initially purchased at the base station 50 and then having the debit meter 100 at the base station 50 add to the purchased debit card any credit purchased by the debit card purchaser at the base station 50. The radio units equipped with changing means then may update the credit amount an: the personal access number as the debit card purchaser uses the debit card. However, users with radio units unequipped with changing means utilize the debit meter 100 at the base station 50, as shown in FIG. 3, to update the credit amount, i.e. purchase and add credit to the debit card, and also to update the personal access number of the debit card. The positioning of base stations and debit meters in candy stores, bodegas, department stores, and the like, thus permits convenient local purchases and local transactions with debit cards to access mobile radio telephone services and other services charged and debited by radio wares, for example, radio facsimile machine services, radio perkonal computer services, automobile services, and the like. For example, telephones, facsimile machines, personal computers, automobiles, etc. capable of communicating service and usage charges and debiting the charges by radio wave, may therefore be leased or rented with greater convenience.

The present invention further includes a method, using a wireless debit card system, comprising the steps of accessing a radio unit 80 with a debit card; reading a credit amount and a personal access number from the debit card; generating a credit signal from the credit amount and the personal access number; transmitting the credit signal over a broadcast channel; receiving the credit signal at a base station 50; relaying the credit signal from the base station 50 to the end station 70 over a communications channel 60; switching the credit signal at the end station 70 using switch 420; allocating the credit amount of the debit card to the radio unit 80 with a communication path through the base station 50; and setting a radio unit access number of the radii unit 80 to the personal access number of the debit card with a communication path through the base station 50.

The method may further include the steps of generating a second control signal at the end station 70; and changing the credit amount of the debit card using the second control signal. In addition, the method may also include the step of changing the personal access number of the debit card using the second control signal.

The step of changing the credit amount may include the steps of revising the credit amount as an updated credit amount; and storing the updated credit amount on the debit card. The step of changing the personal access number may include the steps of revising the personal access number as an updated personal access number; and storing the updated personal access number on the debit card.

For a debit card 30 having a magnetic strip 32 as shown in FIG. 1, the step of reading the credit amount and the personal access number on the debit card 30 may include the step, using a reader 208, embodied as a magnetic reader in the radio unit 80, of reading the magnetic format of the magnetic strip 32 on the debit card 30; and the step of storing the credit amount and the personal access number on the debit card 30 may include the step of writing, using a writer 212, embodied as a magnetic writer in the radio unit 80, the credit amount and the personal access number in a magnetic format on the magnetic strip 32 on the debit card 30.

Alternately, for a debit card 34 having a chip 36 as shown in FIG. 2, the step of reading the credit amount and the personal access number on the debit card may include the step, using a reader processor 210 in the radio unit 80, of reading the memory on the chip 36 on the debit card 34; and the step of storing the credit amount and the personal access number on the debit card 34 may include the step of writing, using a writer processor 212 in the radio unit 80, the credit amount and the personal access number in a memory on the chip 36 on the debit card 34.

For a debit card 30 having a magnetic strip 32 as shown in FIG. 1, the step of revising the credit amount may include the step, using a first processor, embodied as a controller 204, in the radio unit 80, of generating an updated credit amount from the credit amount and from the second control signal; and the step of storing the updated credit amount on the debit card may include the step of writing, using a magnetic writer in the radio unit 80, the credit amount in a magnetic format on a magnetic strip 32 on the debit card 34.

For a debit card 30 having a chip 36 as shown in FIG. 2, the step of revising the credit amount may include the step, using a first processor, embodied as a controller 204 in the radio unit 80, of generating an updated credit amount from the credit amount and from the second control signal; and the step of storing the credit amount on the debit 30 card may include the step of writing, using a writer processor 514 in the radio unit 80, the credit amount in a memory on the chip 36 on the debit card 30.

Similarly, for a debit card 30 having a magnetic strip 32 as shown in FIG. 1, the step of revising the personal access number may include the step, using a first processor, embodied as a controller 204 in the radio unit 80, of generating an updated personal access number from the personal access number and from the second control signal; and the step of storing the updated personal access number on the debit card may include the step of writing, using a writer 212, embodied as a magnetic writer, in the radio unit 80, the updated personal access number in a magnetic format on the magnetic strip 32 on the debit card 30.

Alternately, for a debit card 34 having a chip 36, as shown in FIG. 2, the step of revising the personal access number may include the step, using a first processor, embodied as a controller 204 in the radio unit 80, of generating an updated personal access number from the personal access number and from the second control signal; and the step of storing the personal access number on the debit card may include the step of writing, using a writer processor 214 in the radio unit 80, the updated personal access number in a memory on the chip 36 on the debit card 34.

In addition, the method of the present invention may also include the step of storing the credit amount and the personal access number in a debit meter 100 having a meter processor, embodied as a controller 504, and a memory 506. Using the debit meter 100, the method of the present invention may include the steps of revising the credit amount as an updated credit amount; and storing the updated credit amount in the memory 506 of the debit meter 100. In addition, the step of changing the personal access number may include the steps of revising the personal access number as an updated personal access number; and storing the updated personal access number in the memory 506 in the debit meter 100.

For a debit card 30 having a magnetic strip 32 as shown in FIG. 1, the step of storing the credit amount and the personal access number on the debit card 30 may include the step of writing, using a writer 512, embodied as a magnetic writer, in the debit meter 10, the credit amount and the personal access number in a magnetic format on the magnetic strip 32 on the debit card 30; and the step of reading the credit amount and the personal access number on the debit card 30 may include the step, using a reader 208 embodied as a magnetic reader in the radio unit 80, of reading the magnetic format of the magnetic strip 32 on the debit card 30. Alternately, for a debit card 34 having a chip 36 as shown in FIG. 2, the step of storing the credit amount and the personal access number on the debit card 34 may include the step of writing using a meter processor, embodied as a controller 504 in he debit meter 100, the credit amount and the personal access number in a memory on a chip 36 on the debit card 34; and the step of reading the credit amount and the personal access number on the debit card may include the step, using a reader processor 210 in the radio unit 80, of reading the memory on the chip 36 on the debit card 34.

For a debit card 30 having a magnetic strip 32 as shown in FIG. 1, the step of revising the credit amount may include the step, using the meter processor, embodied as the controller 504 in the debit meter 100, of generating an updated credit amount from the credit amount and from the second control signal; and the step of storing the updated credit amount on the debit card 100 may include the step of writing, using a writer 512, embodied as a magnetic writer in the debit meter 100, the updated credit amount in a magnetic format on the magnetic strip 32 on the debit card 30. Alternately, for a debit card 34 having a chip 36 as shown in FIG. 2, the step of revising the credit amount may include the step, using the meter processor, embodied as the controller 504 in the debit meter 100, of generating an updated credit amount from the credit amount and from the second control signal; and the step of storing the updated credit amount on the debit card may include the step of writing, using the writer processor 514 in the debit meter 100, the updated credit amount in a memory on the chip 36 on the debit card 34.

Also, for a debit card 30 having a magnetic strip 32 as shown in FIG. 1, the step of revising the personal access number may include the step using a meter processor, embodied as the controller 504 in the debit meter 100, of generating an updated personal access number from the personal access number and from the second control signal; and the step of storing the updated personal access number on the debit card 30 may include the step of writing, using a writer 512, embodied as a magnetic writer in the debit meter 100, the updated personal access number in a magnetic format on the magnetic strip 32 on the debit card 30. Alternately, for a debit card 34 having a chip 36 as shown in FIG. 2, the step of revising the personal access number may include the step, using the meter processor, embodied as the controller 504 in the debit meter 100, of generating an updated personal access number from the personal access number and from the second control signal; and the step of storing the updated personal access number on the debit card 34 may include the step of writing, using the writer processor 514 in the debit meter 100, the updated personal access number in a memory on the chip 136 on the debit card 34.

In use, a consumer or user may purchase or rent a radio unit 80 and a debit car, preferably at the location of the base station 50, for example, at a candy store, a bodega, or a department store, Es illustrated in FIG. 3. The debit card may be a card 30 with magnetic strip 32, as shown in FIG. 1, or the debit card may be card 34 with a chip 36 having memory, as shown in FIG. 2. The type of debit card purchased and used is to be compatible with the reader/writer of the radio unit 80. Similarly, the base station 50 may be connected to a debit meter 100, as shown in FIG. 3, so the debit card purchased by the user may be compatible with the reader/writer of the debit meter 100. At the time of purchase or at the time of renting the debit card, the user may purchase an initial amount of credit to the debit card, and subsequently, the user can purchase further credit to the debit card. Whether by using a magnetic strip or by using a chip with memory, the debit card stores the current credit amount allocated to the debit card for use as a declining balance. Updates to the credit amount, due to decreases in the credit amount from charge to the debit card or due to increases in the credit amount by subsequent purchases of further credit, are stored on the debit card.

A unique personal access number is allocated to each debit card, with the personal access number being stored on the debit card. However, the personal access number to each debit card may be changed by rewriting the personal access number stored on the debit card.

After purchasing an initial credit amount and/or an increase in the credit amount of a debit card, the user may proceed to any location away from the base station 50, within a range of the broadcast transmissions of the base station 50, and the user may use the radio unit with the debit card.

During use of the debit card, the user inserts the debit card into compatible radio units, for example, radio telephones, radio facsimile machines, radio personal computers, automobiles, and the like, to access the respective radio unit. The radio telephones, radio facsimile machines, radio personal computers, automobiles, and the like are equipped with debit card readers and/or debit card writers to read and/or update, respectively, the credit amount and the personal access number of the debit card. The personal access number (PAN) may serve as a personal identification number (PIN) or as an account number for the user, but the personal access number may perform other functions, for example, the encoding of additional user information. In use with radio telephones, radio facsimile machines, and radio personal computers, the personal access number may serve as telephone numbers allocated to the debit card as opposed to being allocated to a fixes telephone line to a fixed telephone. Therefore, the personal access number follows the user with the debit card.

In use with the radio units, the credit amount may be debited for charges incurred by use of the debit card. The credit amount may be decreased for charges from outgoing telephone calls, for example, from radio telephones, radio facsimile machines, radio personal computers with modems, and radio telephones connected through an automobile equipped with a debit card reader/writer and the appropriate transceiver instruments.

The credit amount may further be decreased for charges for services, for example, the renting the radio unit in uses, such as renting the automobile having the debit card reader/writer, as well as renting the radio telephone, renting the radio facsimile machine, renting the radio personal computer, and the like.

At each time that the credit amount is increased or decreased on the debit card, and at each time that the personal access number of toe debit card is changed, the radio unit and/or the debit meter which reads and updates the credit amount and the personal access number of the debit card sends a credit signal over radio waves to the base station 50 which relays the credit signal through a communications channel 60 to an end station 70.

At the end star ion 70, a communications switch 420, in response to receiving the credit signal, generates a first control signal to allocate the credit amount of the debit card to the radio unit 80 accessed by the debit card, and the first control signal also sets a radio unit access number of the radio unit 80 to the personal access number of the debit card, using a communication path to the specific radio unit 80 through the base station 50, and fog generating a second control signal for changing the credit amount and the personal access number of the debit card. In response to the first control signal, the radio unit 80 allocates the credit amount of the debit card to the radio unit 80, and sets the radio unit access number of the radio unit 80 to the personal access number of the debit card.

The end station 70 stores and tracks the credit amounts and the personal access numbers of each debit card, and when the credit amount of a given debit card decreases to zero or less, the end station 70 does not allocate a positive credit amount to the debit card until the user purchases additional credit at the base station 50. The controller 204 of the radio unit 80 will not operate the radio unit 80 for the user unless the credit amount of the debit card is a positive amount.

A base station 50 may be wired or may be wirelessly connected to the end station 70, and the base station 50 may use sectional antennae to increase the capacity of the base station 50 to approximately 1000 users. A plurality of base stations may be located approximately one block apart in dense urban areas. The modulation of the radio wave broadcasts between the radio units and the base stations is irrelevant to the operation of the wireless debit card system, although different methods of modulation offer different advantages. For example, spread spectrum modulation and demodulation may be used to minimize interference between radio units.

For changing the credit amount and for changing the personal access number of the debit card, the end station 70 generates a second control signal for changing the credit amount and the personal access number of the debit card. In response to the second control signal, the radio unit 80 or the debit meter 100 changes the credit Count and the personal access number of the debit card inserted into the radio unit 80 or the debit meter 100, respectively.

As the personal access number follows the debit card and as the personal access number may be changed and may be used as a telephone number, each radio unit, for example, a radio telephone, may receive telephone calls to the personal access number as opposed to a fixed telephone number specifically assigned to the radio unit. In addition, each radio unit is assigned a radio unit access number which allows the radio unit to be accessed by other radio units or by other broadcast communications, for example, mobile cellular telephone broadcasts. The radio unit access number of the radio unit may be changed to the personal access number of the debit card inserted into the radio unit, so that each radio unit serves the personal access number of the inserted debit card at any given time. The wireless debit card system also allows a radio unit to serve more than one telephone number and/or personal access number.

Since the personal access number, used as a telephone number, for examples follows the debit card, a user A can insert the debit card of user A into person B's radio telephone for user A to receive calls End to make calls at person B's radio telephone, since the end station 70 instructs person B's radio telephone to change the telephone number of the person B's radio telephone to user A's telephone number stored as a personal access number on user A's debit card. As user A uses person B's radio telephone, user A's telephone calls are charged to user A's debit card, as opposed to having user A's telephone calls being charged to person B.

In other embodiments, the insertion of user A's debit card into person B's radio telephone, for example, may initiate the end station 70 to instruct person B's radio telephone to receive calls to both user A's telephone number and also to person B's telephone number appropriate instructions to the controller of person B's telephone may be used to erase user A's telephone number as an accessible telephone number for incoming calls at a later time.

It will be apparent to those skilled in the art that various modifications can be made to the wireless debit card system and method of the instant invention without departing from the scope or spirit of the invention, and it is intended that the wireless debit card system and method of the instant invention cover modifications and variations of the provided they come within the scope of the append d claims and their equivalents.

What is claimed is:

1. A method comprising:

providing a removable card, the removable card having a memory having a first personal access number and for storing a plurality of telephone numbers associated with an owner of the removable card;

inserting the removable card into a radio unit;

the radio unit transmitting the first personal access code to access a wireless network;

the wireless network receiving the first personal access code and transmitting a second personal access number to the radio unit, the second personal access number different than the first personal access number; and the radio unit transmitting the second personal access number to subsequently access the wireless network.

2. A radio unit comprising:

a removable card having a memory having a first personal access number and for storing a plurality of telephone numbers associated with an owner of the removable card; and a transceiver for transmitting the first personal access number to a wireless network to access the wireless network, the transceiver receives a second personal access number different than the first personal access number, and the transceiver transmits the second personal access number to subsequently access the wireless network.

3. A radio unit comprising:

a removable card having a memory having a first personal access number and for storing a plurality of telephone numbers associated with an owner of the removable card;

means for transmitting the first personal access number to a wireless network to access the wireless network;

means for receiving a second personal access number different than the first personal access number; and means for transmitting the second personal access number to subsequently access the wireless network.

* * * * *

UNITED STATES PATENT AND TRADEMARK OFFICE
CERTIFICATE OF CORRECTION

| | | |
|---|---|---|
| PATENT NO. | : 6,964,369 B2 | Page 1 of 4 |
| APPLICATION NO. | : 10/617995 | |
| DATED | : November 15, 2005 | |
| INVENTOR(S) | : Donald L. Schilling | |

It is certified that error appears in the above-identified patent and that said Letters Patent is hereby corrected as shown below:

ON THE TITLE PAGE

Item (75), Inventor, after the word "Schilling,", delete "Stands" and insert therefor --Sands--.

Item (56), U.S. PATENT DOCUMENTS, page 2, left column, line 39, delete "6,142,369" and insert therefor --6,142,368--.

Item (56), OTHER PUBLICATIONS, page 2, right column, line 41, after "(cellular radio)", delete "ISS" and insert therefor --IEE--.

At column 3, line 37, after "30", delete "pass".

At column 6, line 16, after the word "used", delete "rewritten".

At column 6, line 50, after the word "number,", delete "width" and insert therefor --with--.

At column 6, line 53, after "80", delete "width" and insert therefor --with--.

At column 6, line 60, after the words "to a", delete "bade" and insert therefor --base--.

At colunm 7, line 9, after the word "addition,", delete "etch" and insert therefor --each--.

At column 8, line 29, after the word "means", delete "thee" and insert therefor --then--.

At column 8, line 39, after the word "unit", delete "8" and insert therefor --80--.

At column 8, line 51, after the word "the", delete "de bit" and insert therefor --debit--.

At column 8, line 55, after the word "card.", delete "the" and insert therefor --The--.

At column 8, line 58, after the words "as a", delete "waiter" and insert therefor --writer--.

UNITED STATES PATENT AND TRADEMARK OFFICE
CERTIFICATE OF CORRECTION

PATENT NO. : 6,964,369 B2
APPLICATION NO. : 10/617995
DATED : November 15, 2005
INVENTOR(S) : Donald L. Schilling It is certified that error appears in the above-identified patent and that said Letters Patent is hereby corrected as shown below:

At column 9, line 3, after "32", delete "If" and insert therefor --of--.

At column 9, line 30, after the word "card", delete "310" and insert therefor --30--.

At column 10, line 8, before the word "meter", delete "de bit" and insert therefor -- debit--.

At column 10, line 17, after the word "amount", delete "an:" and insert therefor --and--.

At column 10, line 29, after the word "radio", delete "perkonal" and insert therefor --personal--.

At column 10, line 47, after the words "of the", delete "radii" and insert therefor --radio--.

At column 11, line 25, after the word "card", delete "34" and insert therefor --30--.

At column 11, line 26, after the word "card", delete "30" and insert therefor --34--.

At column 11, line 31, after the word "debit", delete "30" and insert therefor --34--.

At column 11, line 35, after the word "card", delete "30" and insert therefor --34--.

At column 12, Line 7, after the word "meter", delete "10" and insert therefor --100--.

At column 12, line 18, after the word "in", delete "he" and insert therefor --the--.

At column 12, line 31, after the word "card", delete "100" and insert therefor --30--.

At column 12, line 65, after the word "chip", delete "136" and insert therefor --36--.

UNITED STATES PATENT AND TRADEMARK OFFICE
CERTIFICATE OF CORRECTION

| | | |
|---|---|---|
| PATENT NO. | : 6,964,369 B2 | |
| APPLICATION NO. | : 10/617995 | |
| DATED | : November 15, 2005 | |
| INVENTOR(S) | : Donald L. Schilling | |

It is certified that error appears in the above-identified patent and that said Letters Patent is hereby corrected as shown below:

At column 12, line 67, after the word "debit", delete "car," and insert therefor --card,--.

At column 13, line 2, after the word "store,", delete "Es" and insert therefor --as--.

At column 13, line 18, after the word "from", delete "charge" and insert therefor --charges--.

At column 13, line 49, after the words "to a", delete "fixes" and insert therefor --fixed--.

At column 13, lines 61 & 62, after the word "example,", delete "the renting the radio unit in uses, such as renting the automobile having" and insert therefor --renting the radio unit in use, such as renting the automobile housing--.

At column 14, line 1, after the word "of", delete "toe" and insert therefor --the--.

At column 14, line 7, after the word "end", delete "star ion" and insert therefor --station--.

At column 14, line 14, after the word "and", delete "fog" and insert therefor --for--.

At column 15, line 2, after the word "calls", delete "End" and insert therefor --and--.

At column 15, line 14, after the word "number", delete "appropriate" and insert therefor --. Appropriate--.

At column 15, line 23, after the word "variations", delete "of the" and insert therefor --of the invention--.

At column 15, line 24, after the words "of the", delete "append d" and insert therefor --appended--.

UNITED STATES PATENT AND TRADEMARK OFFICE
CERTIFICATE OF CORRECTION

PATENT NO. : 6,964,369 B2 Page 4 of 4
APPLICATION NO. : 10/617995
DATED : November 15, 2005
INVENTOR(S) : Donald L. Schilling It is certified that error appears in the above-identified patent and that said Letters Patent is hereby corrected as shown below:

IN THE CLAIMS

In claim 1, column 16, line 4, after the word "different", delete "than", and insert therefor --from--.

In claim 2, column 16, line 17, after the word "different", delete "than" and insert therefor --from--.

In claim 3, column 16, line 31, after the word "different", delete "than" and insert therefor --from--.

Signed and Sealed this

Fifth Day of December, 2006

JON W. DUDAS
*Director of the United States Patent and Trademark Office*